United States Patent Office 3,258,312
Patented June 28, 1966

3,258,312
ETHYLENE OXIDE MONITORING METHOD AND SHEET MATERIAL, AND PACKAGES BEARING SAME
Melvin M. Olson, Richfield, Minn., assignor to Minnesota Mining and Manufacturing Company, St. Paul, Minn., a corporation of Delaware
No Drawing. Filed Nov. 17, 1960, Ser. No. 69,835
19 Claims. (Cl. 23—232)

This invention relates to a means for monitoring the presence of ethylene oxide, and it particularly relates to a method of monitoring a gas sterilization process.

Since many materials and instruments which are used in modern hospitals must be kept sterile but cannot withstand the heat and/or moisture encountered in a conventional steam sterilization process, there is a growing trend toward the use of ethylene oxide gas as a sporicidal and virucidal agent. Ethylene oxide readily diffuses through paper, boxes, and even plastic bags in which rubber or plastic catheters, lensed instruments, cautery cords, delicate cutting instruments, and the like, may be packaged. When used properly, it is not only lethal to all known micro-organisms at ordinary temperatures but it is also noncorrosive, readily removed by aeration, easily handled and stored, and has a low toxicity to human beings. Despite the many advantages of ethylene oxide, prior to the present invention there has been no satisfactory method of determining whether a package has been exposed to ethylene oxide in a sterilization process; the only technique previously known to me is that of including "spore strips" in each package to be sterilized and assaying the effectiveness of kill, a technique which is both slow and inconvenient.

I have now devised a simple, convenient, reliable and striking way of not only monitoring the continued presence of ethylene oxide but also determining instantly whether a package has been exposed to a gas sterilization cycle. My invention is based on the apparent reaction between ethylene oxide and aqueous solutions of various water-soluble salts to yield hydroxyl ions, as evidenced by the fact that when ethylene oxide is bubbled through such a solution either the pH of the solution increases or the hydroxide corresponding to the dissolved salt is precipitated. According to my invention I employ in conveniently applied and observed form a composition comprising a water-soluble salt whose saturated solution has a fixed pH and which is reactive with ethylene oxide in aqueous solution with resultant increase in hydroxyl ions, said composition including means for effecting a visible change upon increase in the number of hydroxyl ions present. I have found that such a composition visually, and more or less rapidly, indicates ambient ethylene oxide in the presence of moisture. Proper selection of components produces a system which will change color when the ethylene oxide has been present for a time and temperature previously known to effect a kill of bacteria, viruses, and spores. Such a composition may, if desired, be printed or painted on a package to be sterilized. Generally, however, I apply the ethylene oxide-indicating composition to such sheet material as paper or polymeric films, and preferably I apply it to the back of tacky pressure-sensitive adhesive tape which can also be used to seal the packages containing the hospital supplies to be sterilized. My novel tape product thus makes it immediately apparent to an observer whether or not a particular bundle has been gas sterilized.

The exact procedure followed when using gas sterilization methods varies rather widely. For example, the Wilmot Castle Company recommends a processing cycle which includes placing the articles to be sterilized in a pressure chamber, partially evacuating the chamber, and introducing a gaseous mixture of 20% ethylene oxide and 80% carbon dioxide into the chamber under a pressure of about 18 lbs. per square inch gauge, and maintaining the temperature at about 130° F. for a period of 4 hours. Moisture is stated to be of critical importance in killing bacterial spores, the relative humidity being maintained between 20 and 40%. On the other hand, Hall in U.S. Patent No. 2,938,766 sets forth a cycle in which the materials to be sterilized are placed in a retort, preheated from 70 to 100° F. for at least 45 minutes, the retort evacuated, pure ethylene oxide introduced, and the material exposed to the gas from ½ to 4 hours. It is believed that the exposure time required is decreased as the temperature, gas concentration, or gas pressure is increased. Accordingly, the specific ethylene oxide-indicating composition used in practicing my invention will be dependent to some extent on the sterilization cycle employed and the degree of kill required. Indications as to how adjustments may be made in the compositions will be set forth in the illustrative but non-limitative examples below:

*Example 1*

The following components were dissolved in 2½ gallons of ethanol:

4 lbs. powdered polyvinylpyrrolidone
7.5 lbs. of a 50% isopropanol solution of a 30:70 copolymer of vinylpyrrolidone and vinyl acetate
.24 lbs. malachite green oxalate. (This acid-base indicator changes from green to colorless as pH is increased approximately from 11.5 to 13.)

Into the above solution was then stirred 2.4 lbs. of titanium dioxide.

One quart of water and one quart of glycerin were separately mixed together and 1.2 lbs. of potassium iodide added. Merck's Index reports that an aqueous solution of potassium iodide has a pH of 7 to 9. This solution was now dissolved in the solution described in the preceding paragraph, after which the blended solution was diluted to five gallons by the addition of ethanol.

A semi-glassine wet-creped paper backing made from highly beaten paper fibers and essentially devoid of other components, as described in Swedish, O'Brien and Picard U.S. Patent No. 2,940,591, was coated with the solution prepared in the preceding paragraph, a No. 150 Mueller Ruling Mill Cylinder being used to apply the solution. The sheet was next overprinted with a diagonal line pattern cylinder, which applied ⅛ inch x 3 inch bars spaced approximately 7/16 inches apart. The overprinting composition was prepared by mixing 3⅓ gallons of a 35% xylol:butyl alcohol:butyl acetate solution of nitrocellulose plasticized with 35% tricresyl phosphate by weight based on the nitrocellulose, 1⅔ gallons of butyl acetate, 100 grams of malachite green oxalate, and 1,050 grams of titanium dioxide. The printed paper was then coated with a low adhesion polyurethane backsize of the type described in Hendricks & Dahlquist U.S. Patent No. 2,532,011, using a No. 180 ruling mill cylinder. The web was then dried at 250° F. for about ½ minute and the opposite surface then coated with an aggressive rubber-resin tacky pressure-sensitive tape adhesive in a manner well-known to those skilled in the art. The tape was thereafter slit into desired widths and wound upon itself in roll form, the low adhesion backsize permitting ready unwinding without transferring the colored coatings from the back to the tacky adhesive.

The back surface of the tape described above had a uniform medium green color; upon exposure to an atmosphere containing 12% ethylene oxide and 88% carbon dioxide at 40% relative humidity under one atmosphere pressure for 2 hours at 160° F., the first-applied green color faded away to leave only the medium green bars extending diagonally across the back. The moisture-resistant nitrocellulose binder prevented color change in the area of the bars, while the water-soluble polyvinylpyrrolidone based binder permitted color change in the first-applied coat, the titanium dioxide enhancing color contrast. Since malachite green is colorless at all pH's beyond 13, even extreme overexposure to ethylene oxide has no further effect on the appearance of the tape.

Desirably, the appearance of the tape should be such that it will not be readily confused with non-indicating pressure-sensitive adhesive tapes either before or after exposure to ethylene oxide. Where the indicator is of a type which changes from one color to another color (rather than from colored to colorless, as in this example, or vice versa), only one color coat is necessary, both the original and the changed color being distinct from that of other tape products. A uniform appearance may be attained by either coating the entire backing or by marking any desired pattern thereon.

The novel tape construction of the preceding example represents the presently preferred embodiment of my invention. For many purposes, however, a much simpler construction functions equally satisfactorily. For example, a solution of water, potassium iodide and malachite green may be applied directly to a backing, dried and used to detect ambient ethylene oxide, the very water-soluble nature of malachite green (less than 1 part water being required to dissolve 1 part of indicator) obviating the necessity for a humectant in most circumstances. Similarly such ingredients may be added directly to the beater of a papermaking machine to provide an inexpensive product for use in the practice of my invention.

Because of the fact that all reactions resulting in a color change will ordinarily be required to take place with the aid of only atmospheric moisture, it is highly desirable to employ indicators which are at least "sparingly soluble" in water, i.e., soluble in from 30–100 parts of water (see the discussion of "solubility" in Hackh's Chemical Dictionary). Indicators which are "slightly soluble," i.e., soluble in from 100–1000 parts of water, have, however, been found effective. When the acid-base indicator prior to color change is "insoluble" i.e., requires more than 10,000 parts of water per part of indicator to effect solution), it is difficult to insure the presence of sufficient moisture for the color change to take place under the wide range of gas sterilizing conditions in common use. Even if such indicators do change color, they tend to "fade" to their original color, the separation of the insoluble form tending to displace the customary equilibrium toward the acid side. Further, the carbon dioxide usually present in overwhelming amounts during sterilization and always present in the atmosphere aggravates this phenomenon. Examples of "insoluble" indicators, as listed in the 1959 Merck Index are phenolphthalein and thymolphthalein, and if such indicators are used it is essential to insure an excess of moisture by the use of a humectant, a hygroscopic salt (which may also be the ethylene oxide-reactive salt), or the like. In some instances, however, it is possible to use even such "insoluble" acid-base indicators in compositions which, after exposure to ethylene oxide with no visible effect, change color upon being subjected to distilled water or steam, which temporarily provides enough water to dissolve the indicator and provide an ionizing medium.

Various modifications may be made in the composition of the ethylene oxide-indicating materials to regulate the rate of color change. For example, the presence of a binder material, even when water-soluble, tends to retard the multiple reactions. Similarly, decreasing the amount of salt to 1/20 that shown in Example 1 increases the amount of time required for a given color change, at a given concentration of ethylene oxide and moisture vapor, by a factor of about 5. The proximity of the pH of a saturated solution of the salt to the indicator's color change interval also affects the rate of color change, and I generally prefer to maintain a spread of at least 2 pH units to prevent unduly rapid action. If the pH of the saturated salt solution is too high for the desired indicator, I may include enough nonvolatile acid to lower the pH to a more suitable value. Likewise, a mixed indicator composition may be employed to give a series of color changes at increasing pH and permit even finer monitoring techniques.

*Example 2*

In a solution consisting of 210.0 grams of ethanol, 60.0 grams of glycerin, and 90.0 grams of water, were dissolved 2.4 grams of thymolphthalein and 83.0 parts of polydiethylaminoethylmethacrylate methyl bromide quaternary salt. The last-named ingredient combines the functions of binder, ethylene oxide-reactive salt, and, to a lesser degree, that of a humectant. The solution was then coated on filter paper and air-dried, the coating rendering the paper slightly translucent but being otherwise invisible. The coated paper was then exposed to an atmosphere containing 20% ethylene oxide gas and 80% carbon dioxide at a relative humidity of 20% and a temperature of 140° F. After two hours the coated paper was observed to be deep blue in color.

*Examples 3–10*

Each of the following examples was prepared by adding a salt and an acid-base indicator to a stock solution made by mixing together 1.6 parts of polyvinylpyrrolidone, 3.4 parts of ethanol, 1 part of glycerin, and 1.5 parts of water, all by weight. In each case the indicator was added in an amount equal to 6.7 milligrams per gram of stock solution; the salt was added in the amount equal to 0.8 milligram-equivalents per gram of stock solution. Individual compositions made of stock solution, indicator, and salt were coated on filter paper and air dried. When exposed to ambient conditions of 20% ethylene oxide and 80% carbon dioxide at a relative humidity of 20% and a temperature of 140° F. for 2 hours, the color change took place as noted.

| Example | Salt | Indicator | Color Before Exposure | Color After Exposure |
|---------|------|-----------|----------------------|----------------------|
| 3 | $SnCl_2$* | Metacresol Purple. | Red | Yellow. |
| 4 | $AlCl_3 \cdot 6H_2O$ | Bromthymol Blue. | Yellow | Green. |
| 5 | LiBr | Metacresol Purple. | do | Do. |
| 6 | KSCN | do | do | Dark Blue. |
| 7 | NaOAc | do | Dark Green | Purple. |
| 8 | $Na_2S_2O_3$ | do | Green Yellow | Dark Green. |
| 9 | $MgBr_2 \cdot 6H_2O$ | do | Orange-Yellow. | Do. |
| 10 | $Na_2HPO_4$ | Alizarin Yellow. | do | Deep Reddish Brown (10 hrs., 20% EtO, 20% R. H., 170° F.) |

*Sufficient HCl added to dissolve the $Sn(OH)_2$ formed.

Still another application for compositions used in the practice of my invention may reside in their use to detect the presence of free ambient ethylene oxide in aqueous media, e.g., eye drops. A convenient technique is to place a drop of the material to be tested upon the ethylene oxide-detecting means and maintain contact for several minutes.

Means other than acid-base indicators may be employed to effect a visible change in the compositions and constructions used in the practice of my invention. For example, I have found that cupric chloride, which is more or less chartreuse in color, yields a Kelly green product when exposed to ethylene oxide in the presence of moisture, presumably because of the presence of a substantial amount of blue cupric hydroxide; prolonged exposure may yield a completely blue product. Similarly, cobaltous chloride, which is blue when anhydrous and red when hydrated, reacts with ethylene oxide in the presence of moisture to yield a brownish-black product. Other water-soluble metallic salts whose hydroxide differs in color may be used to achieve similar results. I regard the substitution of such, or analogously functioning, materials in the practice of my invention as the use of an equivalent.

What I claim is:

1. The method of detecting the presence of substantial amounts of ambient ethylene oxide in a given environment which comprises the steps of exposing to said environment in the presence of moisture a detecting means comprising water-soluble salt the saturated aqueous solution of which has a fixed pH, said salt in aqueous solution being reactive with ethylene oxide with an increase in hydroxyl ions, and said detecting means including means for effecting a visible change in said detecting means upon increase in the number of hydroxyl ions.

2. The method of monitoring an ethylene oxide gas sterilization process which includes the steps of exposing to ethylene oxide in the presence of moisture, material to be gas sterilized and a monitoring means comprising a water-soluble salt the saturated aqueous solution of which has a fixed pH, said salt in aqueous solution being reactive with ethylene oxide with a resultant increase in hydroxyl ions, and said monitoring means including means for effecting a visible change in said monitoring means upon increase in the number of hydroxyl ions, and maintaining ethylene oxide in contact with said material and said salt until a visible change occurs in said monitoring means.

3. The method of monitoring an ethylene oxide gas sterilization process which includes the steps of placing in a sterilization chamber the material to be gas sterilized together with a monitoring means comprising an intimate admixture of an ethylene oxide-reactive water-soluble salt which has a known pH in saturated aqueous solution, the number of hydroxyl ions in an aqueous solution of said salt increasing when ethylene oxide gas is bubbled therethrough, and an acid-base indicator which changes color at a pH higher than said known pH; providing moisture; introducing ethylene oxide into said chamber; and maintaining ethylene oxide in said chamber until said indicator changes color.

4. Sheet material suitable for detecting ambient ethylene oxide, comprising a carrier sheet bearing an intimate admixture of components consisting essentially of an ethylene oxide-reactive water-soluble salt which has a fixed pH in saturated aqueous solution, the pH of an aqueous solution of said salt increasing when ethylene oxide gas is bubbled therethrough, and an acid-base indicator which is at least slightly soluble in water and which has a color change interval at a range of pH's higher than said fixed pH.

5. Sheet material suitable for detecting ambient ethylene oxide, comprising a carrier sheet bearing an intimate admixture of components consisting essentially of an ethylene oxide-reactive water-soluble salt which has a fixed pH in saturated aqueous solution, the pH of an aqueous solution of said salt increasing when ethylene oxide gas is bubbled therethrough, a humectant, and an acid-base indicator having a color change interval at a range of pH's higher than said fixed pH.

6. Pressure-sensitive adhesive sheet material which may be used to seal packages of hospital supplies prior to sterilization with ethylene oxide gas and which may be used to determine in the presence of moisture whether exposure to ethylene oxide gas has taken place, comprising in combination: a sheet backing coated on one side with a normally tacky and pressure-sensitive adhesive and bearing at its other side an exposure-detecting means comprising a water-soluble salt, said salt in aqueous solution being reactive with ethylene oxide with a resultant increase in hydroxyl ions and said exposure-detecting means including means for effecting a visible change in said exposure-detecting means upon increase in the number of hydroxyl ions.

7. Pressure-sensitive adhesive sheet material which may be used to seal packages of hospital supplies prior to sterilization with ethylene oxide gas and which may be used to determine if the exposure to ethylene oxide gas has taken place, comprising in combination: a sheet backing coated on one side with a normally tacky and pressure-sensitive adhesive and bearing at its other side an intimate admixture of an ethylene oxide-reactive water-soluble salt which has a fixed pH in saturated aqueous solution, the pH of an aqueous solution of said salt increasing when ethylene oxide gas is bubbled therethrough, and an acid-base indicator having a color change interval at a range of pH's higher than said fixed pH.

8. Pressure-sensitive adhesive sheet material which may be used to seal packages prior to sterilization with ethylene oxide gas, even in the absence of moisture, and which may be used to determine if the desired exposure has been attained, comprising in combination: a sheet backing provided on one side with a normally tacky and pressure-sensitive adhesive, and bearing at its other side a detecting means comprising an intimate admixture of a humectant and an ethylene oxide-reactive water-soluble salt, said salt in aqueous solution being reactive with ethylene oxide with resultant increase in hydroxyl ions, and said detecting means including means for effecting a visible change upon increase in the number of hydroxyl ions.

9. Pressure-sensitive adhesive sheet material which may be used to seal packages of surgical instruments prior to sterilization with ethylene oxide gas and which may be used to determine visually if the desired exposure has been attained, comprising in combination: a sheet backing coated on one side with a normally tacky and pressure-sensitive adhesive, the opposite surface of said sheet being provided with a binder containing a humectant, an ethylene oxide-reactive water-soluble salt which has a fixed pH in saturated aqueous solution, the pH of an aqueous solution of said salt increasing when ethylene oxide gas is bubbled therethrough, and a minor amount of an acid-base indicator having a color change interval at a range of pH's higher than said fixed pH.

10. The method of monitoring an ethylene oxide gas sterilization process which includes the steps of applying the pressure-sensitive adhesive tape of claim 6 to a package of materials to be sterilized, exposing said package to ambient ethylene oxide in the presence of moisture, and observing whether the appearance of the tape visibly changes.

11. A telltale device for ethylene oxide sterilization comprising a sheeted backing member selected from the group consisting of paper and synthetic plastic film, a tablet of ethylene-oxide-sensitive printing ink composition attached to said backing member, and a transparent synthetic plastic covering membrane attached to said backing member over said tablet; said covering membrane being permeable to ethylene oxide.

12. A telltale device for ethylene oxide sterilization comprising a sheeted backing member selected from the group consisting of paper and synthetic plastic film, a printed spot of ethylene-oxide-sensitive ink on said backing member, and a transparent synthetic plastic covering membrane attached to said backing member over said printed spot; said covering membrane being permeable to ethylene oxide.

13. A telltale device for ethylene oxide sterilization comprising a sheeted backing member selected from the group consisting of paper and synthetic plastic film, a printed spot of ethylene-oxide-sensitive ink on said backing member, and a transparent synthetic plastic covering membrane attached to said backing member over said printed spot; said backing member being non-permeable to ethylene oxide, and said covering membrane being permeable to ethylene oxide.

14. A telltale device for ethylene oxide sterilization comprising a sheeted backing member selected from the group consisting of paper and synthetic plastic film, a printed spot of ethylene-oxide-sensitive ink on said backing member, and a synthetic plastic transparent covering membrane attached to said backing member over said printed spots.

15. A sheet of severable telltale devices for ethylene oxide sterilization comprising a sheeted backing member selected from the group consisting of paper and synthetic plastic film, a plurality of spots of ethylene-oxide-sensitive ink composition attached to said backing member, and a transparent synthetic plastic covering membrane attached to said backing member over and around each of said printed spots; said covering membrane being permeable to ethylene oxide.

16. A telltale device for ethylene oxide sterilization comprising a sheeted backing member selected from the group consisting of paper and synthetic plastic film, ethylene-oxide-sensitive composition attached to said backing member, and a transparent synthetic plastic covering member attached to said backing member over said composition; said covering membrane being permeable to ethylene-oxide.

17. A package bearing indicia formed of an intimate admixture of an ethylene oxide detecting means comprising water-soluble salt, said salt in aqueous solution being reactive with ethylene oxide with an increase in hydroxyl ions, and said detecting means including means for effecting visible change in said detecting means upon increase in the number of hydroxyl ions.

18. A package having externally visible markings comprising an intimate admixture of an ethylene oxide-reactive water-soluble salt which has a fixed pH in aqueous solution, the pH of an aqueous solution of said salt increasing when ethylene oxide gas is bubbled therethrough, and an acid-base indicator having a color change interval at a range of pH's higher than said fixed pH.

19. A package having an outer wrapping comprising the product of claim 4.

References Cited by the Examiner

UNITED STATES PATENTS

| | | | |
|---|---|---|---|
| 1,512,893 | 10/1924 | Fulweiler | 23—232 |
| 2,054,885 | 9/1936 | Schroter | 23—232 |
| 2,131,134 | 9/1938 | Baer et al. | 21—58 |
| 2,189,949 | 2/1940 | Griffith et al. | 21—58 |
| 2,234,499 | 3/1941 | McAllister | 23—254 |
| 2,606,102 | 8/1952 | Cook | 23—254 |
| 2,798,855 | 7/1957 | Hainsworth | 252—408 |
| 2,823,984 | 2/1958 | Mavrodineanu | 23—232 |
| 2,998,306 | 8/1961 | Huyck et al. | 23—254 |
| 3,000,706 | 9/1961 | Royce | 23—232 |

MORRIS O. WOLK, *Primary Examiner.*

MAURICE A. BRINDISI, DELBERT E. GANTZ,
*Examiners.*

Z. PAROCZAY, *Assistant Examiner.*